Jan. 14, 1969  R. C. BUNGER  3,421,635
NUCLEAR FUEL HOIST

Filed Dec. 29, 1966  Sheet 1 of 4

INVENTOR
ROBERT C. BUNGER
BY Richard H. Berneike
ATTORNEY

INVENTOR
ROBERT C. BUNGER
BY Richard H. Berneike
ATTORNEY 3,421,635
NUCLEAR FUEL HOIST
Robert C. Bunger, Newington, Conn., assignor to Combustion Engineering, Inc., Windsor, Conn., a corporation of Delaware
Filed Dec. 29, 1966, Ser. No. 605,665
U.S. Cl. 212—129                5 Claims
Int. Cl. B66c *19/00;* B66c *17/08;* G21c *19/20*

ABSTRACT OF THE DISCLOSURE

A nuclear fuel hoist having an extendable and rotatable fuel grabbing means and guiding or keying means for preventing relative rotation between the grabbing means and the fuel during the hoisting operation to prevent accidental release of the fuel.

BACKGROUND OF THE INVENTION

In a nuclear reactor which is to operate over an extended period of time, such as a reactor which is to be utilized for the generation of electrical power, it is essential that provision be made for the periodic cycling of the fuel. Some reactors, for instance, have zoned cores in which there is fuel having varying degrees of burnup. At each recycling period, which might occur on the order of once a year, the fuel from the most depleted zone is removed from the reactor and transferred to a spent fuel storage area. The remaining fuel is then rearranged within the reactor core and fresh fuel is inserted to replace the depleted fuel which has been removed. It is therefore necessary to incorporate remote handling equipment into the plant design which is capable of carrying out these fuel transfer operations with a high degree of reliability. It is, of course, desirable that this equipment be simple in construction and operation, free from possible mechanical failures and yet capable of effecting a positive attachment to the fuel which is unable to accidentally release and drop the fuel.

Many prior art fuel handling mechanisms have employed stored energy from a spring or weight to close some sort of grabbing means on the fuel lifting attachment or handle. Such grabs are often opened by pneumatic, hydraulic, or magnetic force against the spring or weight. There is often the danger that the lifting mechanism will become disengaged from and drop the fuel through a malfunction or operator error in activating the disengaging circuits. There is also the problem with these more complicated devices of a mechanical failure which can create a real problem particularly in view of the difficulty of repair during refueling operations when the radiation level is high.

SUMMARY OF THE INVENTION

It is therefore an object of the present invention to provide a safe, reliable and simple fuel hoist which does not depend upon stored energy devices to effect the engagement with the fuel and which cannot accidentally be released after the fuel has been lifted. The hoist of the present invention operates by merely lowering a conventional grabbing means such as a J or L slot grab over the lift handle on the fuel assemblies and then turning the grab to engage the lift handle in the grab slots. Turning the slotted grab can only be accomplished when the grab is substantially fully extended into the proximity of the fuel assembly which is to be lifted. The device also includes means for preventing the rotation of the fuel assembly after the assembly has been lifted a short distance. Since neither the grab nor the fuel assembly can rotate with respect to the hoist, they cannot rotate with respect to each other and therefore cannot become disengaged. This is accomplished by first employing guiding or keying means which engage the fuel assemblies after being raised a matter of a few inches and thus prevent the fuel assemblies from turning with respect to the hoist. Additionally, a means is provided which is rigidly affixed to the grab for turning the grab, which is also guided or keyed so as to prevent rotation of the grab except during the desired portion of the path of travel of the grab. The hoist is furthermore designed such that it may be employed to lift other components such as control rods from the reactor.

DESCRIPTION OF THE PREFERRED EMBODIMENT

Figure 1:
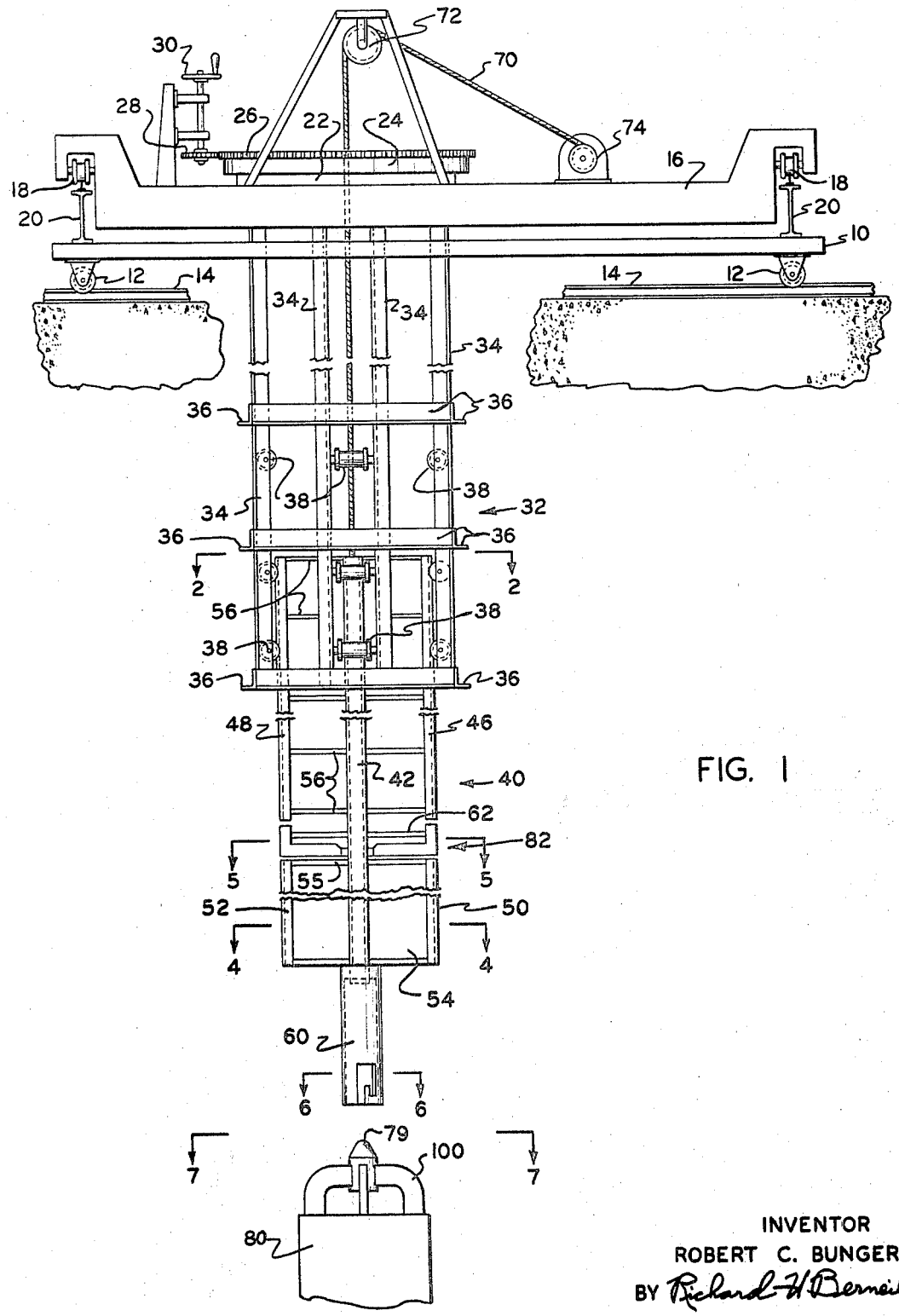
FIG. 1 is an elevation view of the fuel hoist of the present invention positioned over a typical fuel assembly.

Referring first primarily to FIG. 1, there is illustrated the hoist of the present invention mounted for use with a nuclear reactor which is not shown. Mounted above the reactor vessel is a bridge 10 which is movable to the right and left in the drawing on wheels 12 and track 14 to any desired position above the reactor and the associated spent and fresh fuel storage areas. Mounted on the bridge 10 is trolley 16 which is movable on wheels 18 and tracks 20 at right angles to the movement of the bridge for locating the lifting mechanism precisely over any desired position. The movement of the bridge 10 and trolley 16 may of course be suitably controlled so as to be automatically positioned over any desired fuel assembly location within the reactor core or any other desired location. Thus, by merely pressing a button for the desired position, the hoist could automatically be indexed to that position.

On top of the trolley 16 is a bearing means 22 on which is rotatably mounted circular support means 24. On the periphery of the support means 24 is located the gear means 26 which is in turn engaged by the gear 28. This gear 28 may be rotated by means of the hand wheel 30 in order to rotate gear 26 and thus the support means 24. Rotation of these gears and thus the support means 24 rotates the fuel lifting means as may be necessary for proper positioning. The hand wheel 30 may obviously be replaced by other drive means such as an electric motor which could also be automatically positionable for the various operations.

Suspended from the support means 24 is the framework generally indicated at 32. This framework 32 is rotatable with the support means 24 but is vertically stationary. The construction of this framework can be most readily seen in FIGS. 1 and 2. The vertical members 34, which can be common angle irons, extend up to and are attached to the support means 24 such as by welding. These vertical members 34 are in turn attached to each other and supported by the horizontal angle irons 36. There may, of course, be any number of such horizontal support means as may be required and there may further be diagonal bracing means provided if necessary although such have not been illustrated. Mounted between the vertically extending angle irons 34 are rollers 38 which serve to guide the vertical movement of the lifting assembly generally indicated at 40 up and down within the vertically stationary framework 32.

Figure 2:
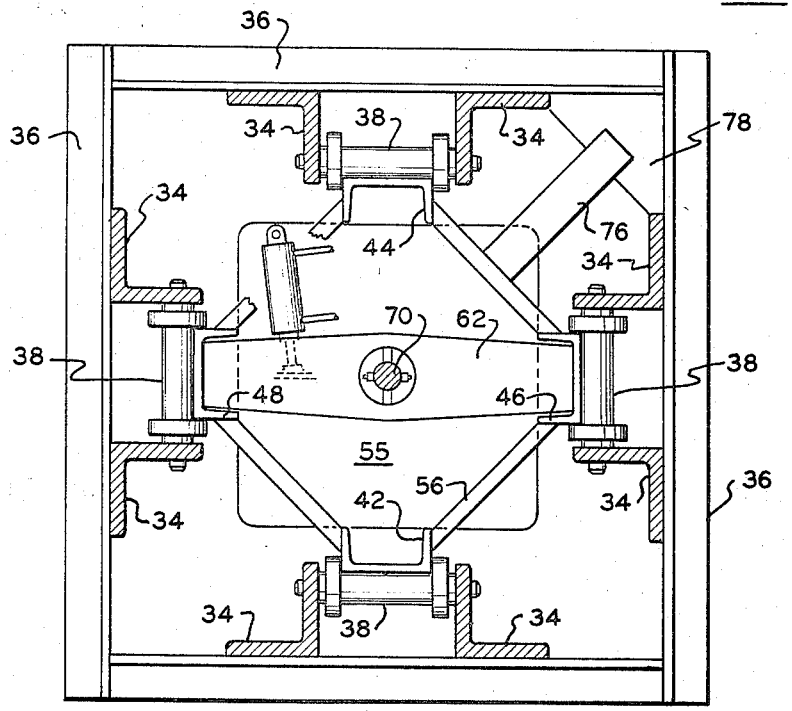
FIG. 2 is a section view taken along line 2—2 of FIG. 1.
Figure 4:
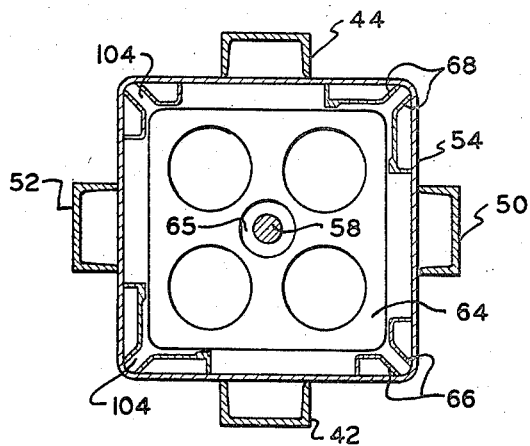
FIG. 4 is a section view taken along line 4—4 of FIG. 1.
Figure 3:
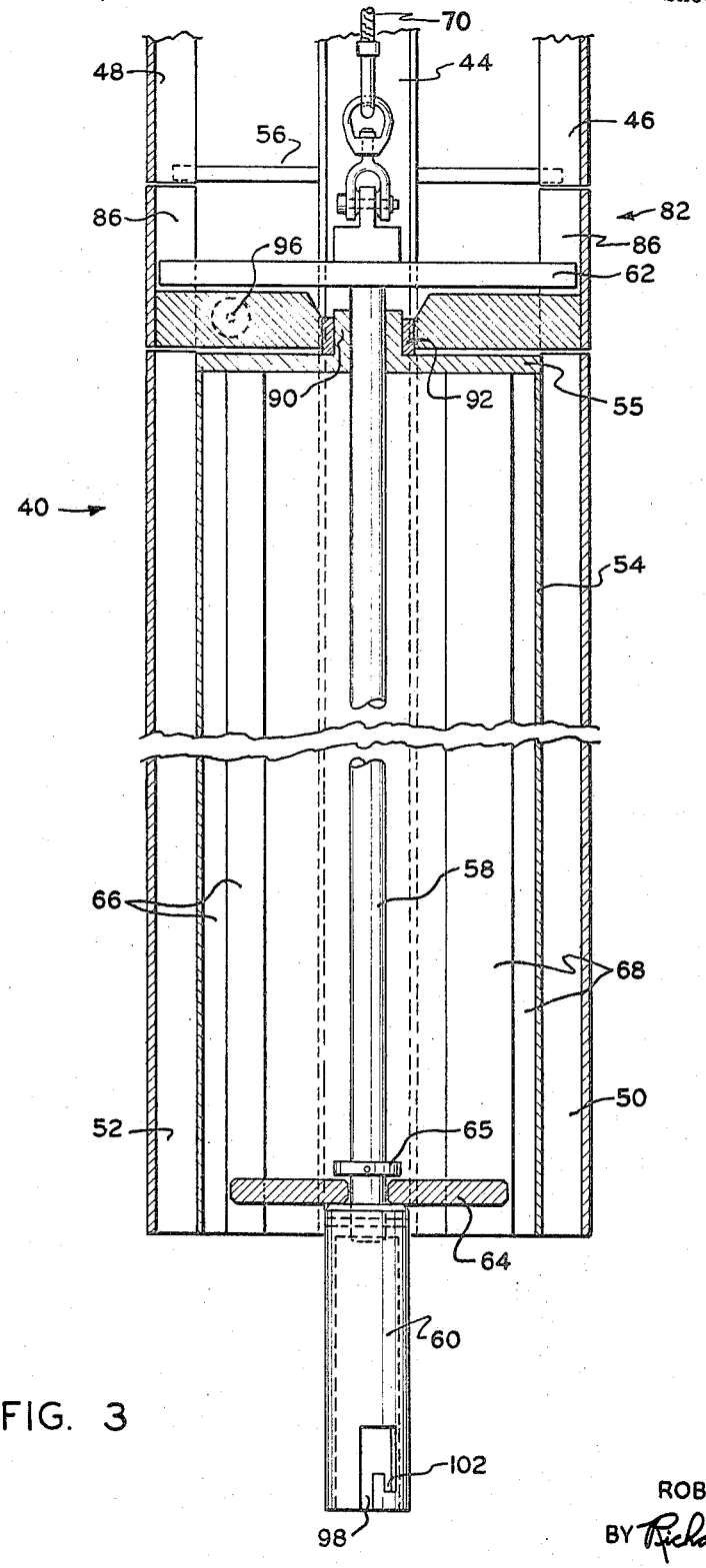
FIG. 3 is a vertical section view of the lower portion of the fuel hoist as depicted in FIG. 1.

The construction of the lifting assembly 40 of the hoist can best be seen in FIGS. 1, 3 and 4. This assembly is composed of vertically extending channels 42, 44, 46, 48, 50 and 52. The channels 42 and 44 extend the entire length of the assembly 40 and ride on the corresponding rollers 38. The channels 46 and 48 as shown in FIG. 1 extend only throughout the upper portion of the assembly while channels 50 and 52 extend only throughout the lower portion for reasons explained hereinafter. These channels are also guided by the corresponding rollers 38. The lower section of the lifting assembly 40 is enclosed by a shroud or casing 54 which is capped with the plate 55. The channel members 42, 44, 50 and 52 are attached to the external surface of this shroud 54 such as by welding. The channel members 42, 44, 46 and 48 in the upper section of the lifting assembly 40 are connected together by means of the support struts 56 as shown in FIGS. 1, 2 and 3. This lifting assembly 40 can be raised and lowered within the framework 32 on the rollers 38 by means described hereinafter to carry out the fuel transfer operations.

Mounted for movement within the lifting assembly 40 is the actual lifting device including a hoist bar 58 with the grab 60 rigidly mounted at the lower end and an actuator plate 62 rigidly mounted at the upper end. The hoist bar also has mounted thereon a guide plate 64 which is free to rotate about the hoist bar 58 but which is maintained in position by means of collar 65. This guide plate rides upon the rail members 66 and 68 which are attached to the interior corners of the shroud 54 as shown in FIG. 4. This guide plate and the rail members cooperate to center the hoist bar and thus the lifting device within the shroud 54.

Rotation of the actuator plate 62 causes rotation of the hoist bar 58 as well as the grab 60 since these elements are all rigidly affixed to each other. Such rotation moves the grab selectively into the locked and unlocked positions as will be pointed out hereinafter. Attached to the upper part of the actuator plate 62 is a cable 70. This cable 70 extends from the actuator plate 62 up through the framework 32 to the pulley 72 from which the cable extends to the hoist motor 74.

Figure 8:
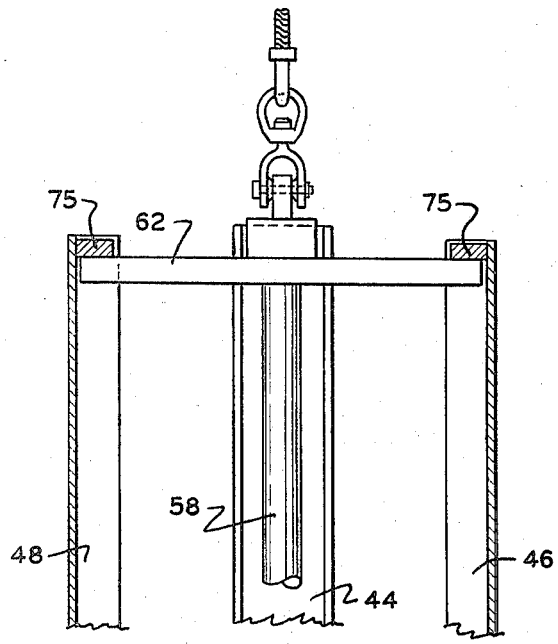
FIG. 8 is an illustration of an alternative arrangement for raising the lifting assembly.

In the raised position, the collar 65 will be firmly up against the cap plate 55. The cable 70, the hoist bar 58 and the collar 65 will thus be holding the lifting assembly 40 in a raised position. Upon lowering the cable 70, the entire lifting assembly 40 including the hoist bar 58, the grab 60, the collar 65, and the associated elements will be lowered. FIG. 8 illustrates an alternative arrangement for raising the lifting assembly 40 within the framework 32 wherein the actuator plate 62 comes into engagement with the stops 75 located at the upper end of the channels 46 and 48. In this arrangement, the collar 65 would be slightly below cap plate 55 at the point of engagement of the actuator plate 62 and stops 75.

Attached to the lifting assembly 40 is an extending member 76 as shown in FIG. 2. Attached to the framework 32 is a stop member 78 also as shown in FIG. 2. When the lifting assembly 40 has been lowered to the appropriate position, the extending member 76 will engage the stop member 78 thus preventing the lifting assembly 40 from descending further. Upon further lowering of the cable 70, the hoist bar 58, the grab 60, the collar 65, and the guide plate 64 will be lowered within the lifting assembly 40 to a point slightly above that shown in FIG. 3. At such a position, the grab 60 will be slightly above the lifting handle 79 on the fuel assembly 80. At this point the actuator plate 62 will have moved from within channels 46 and 48 to a position within the grab operator 82.

Figure 5:
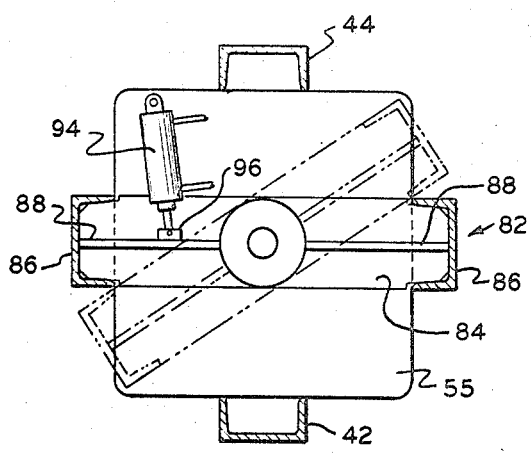
FIG. 5 is a section view taken along line 5—5 of FIG. 1.
Figure 6:
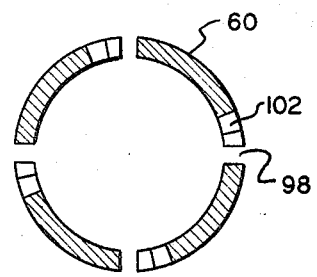
FIG. 6 is a section view taken along line 6—6 of FIG. 1 illustrating a section view of a J grab.
Figure 7:
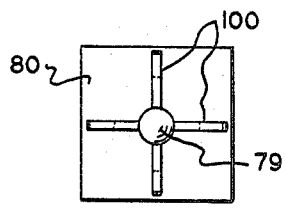
FIG. 7 is a view taken along line 7—7 of FIG. 1 illustrating a plan view of a typical fuel assembly.

The grab operator 82, as can most clearly be seen in FIGS. 3 and 5, comprises a base portion 84, channel portions 86, and web portions 88 all connected together. This grab operator 82 is rotatably mounted about the central portion 90 of the cap plate 55 by means of bearing 92. The channel portions 86 of the grab operator engage the actuator plate 62 when it has been lowered within these channel portions. Thus rotation of the grab operator causes rotation of the actuator plate 62 and in turn rotation of the grab 60. Mounted on the cap plate 55 is an actuating cylinder 94 which may be pneumatic, hydraulic, or magnetic. This actuating cylinder 94 is also connected to the grab operator 82 at the point 96. Thus operation of the actuating cylinder causes rotation of the grab operator from its normal or locked position through an angle of perhaps 30° to the unlocked position shown in phantom in FIG. 5.

In operation, the cable 70 is lowered such that the actuator plate 62 is just within the grab operator 82. At this position the grab 60 is just above the lifting handle 79 on the fuel assembly as previously stated. The cylinder 94 is then activated so as to rotate the grab operator 82. This rotates the grab 60 into a position such that the slots 98 therein can be lowered over the support members 100 of the lifting handle 79. The cable 70 is then lowered to effect this engagement of the grab 60 and fuel assembly 80. The cylinder 94 is next operated so as to return the grab operator 82 to the normal or locked position. This rotates the grab such that the support members 100 will fall into the J slots 102 in the grab when the grab is raised slightly. As the cable 70 is raised further, the fuel assembly 80 enters the lifting assembly 40. The fuel assembly then engages the rails 66 and 68 and is prevented from rotating with respect to the lifting assembly 40. At this point the actuator plate 62 has been raised from the channel portions 86 of the grab operator 82 and into the channels 46 and 48 and the actuator plate thus also cannot be rotated. Thus rotation of both the fuel assembly and the grab is impossible and the grab cannot become disconnected from the fuel assembly. This is true even though the operator might accidentally activate the grab operator since rotation of the grab operator would not have any effect upon the grab as the activator plate is no longer within the channels of the grab operator. The cable 70 is then raised further to a position where the collar 65 is once again up against the cap plate 55 (or the actuator plate 62 is up against the stops 75) and the fuel assembly is entirely or substantially within the shroud 54 of the lifting assembly 40. The cable 70 continues to be raised so as to raise the lifting assembly 40 together with the fuel assembly 80 up substantially within the framework 32. When fully raised, the fuel assembly has been lifted sufficiently to clear the flange of the reactor vessel (the reactor vessel head has been removed). The hoist may then be shifted and the fuel assembly transferred to a storage area or to another device which will in turn transfer the fuel to the storage area. The entire process is then reversed for transfer of fuel from the fresh fuel storage area to the reactor core.

Since it is often necessary to also remove control rods from the reactor core, the hoist of the present invention has been designed for such a purpose. Controls rods of the conventional cruciform design and with a similar type of lifting handle as the fuel assemblies can be lifted with the same grab as used for the fuel assemblies. The rails 66 and 68 as shown in FIG. 4 are spaced in corners of the shroud 54 such that the tips of the cruciform rod will fit into the spaces 104 between the rails. Thus the rails in cooperation with the control rod will prevent any rotation of the control rod and thus prevent any accidental unlatching of the grab from the control rod. The operation of the hoist in lifting control rods is in all other respects similar to the lifting of the fuel assemblies.

While the invention has been described with reference to fuel assemblies having a square cross section, it is obvious that the hoist could be readily adapted to accommodate fuel assemblies of other configurations. For instance, the shroud 54 could be in the form of a hexagon with suitably arranged rail members to lift and prevent rotation of hexagonal fuel assemblies. The same principle would apply to any other shaped assembly, the only requirement being that keying or guiding means be provided to prevent rotation of the fuel assembly within the shroud.

While a preferred embodiment of the invention has been shown and described, it will be understood that such showing is merely illustrative and that changes may be made without departing from the spirit and scope of the invention as claimed.

I claim:

1. Handling apparatus for nuclear fuel assemblies comprising grab means for engaging and disengaging fuel assemblies upon angular rotation, a grab actuator, means connecting said grab to said grab actuator whereby angular rotation of said grab actuator causes angular rotation of said grab, means for moving said grab and grab actuator and connecting means longitudinally of said apparatus between a fully retracted and a fully extended position, guide means for guiding and preventing rotation of said grab actuator from a locked position during said longitudinal movement from said fully retracted position to a position just short of said fully extended position, a grab operator, said grab operator including means for engaging said grab actuator, said engaging means normally aligned with said guide means whereby said grab actuator enters said grab operator from said guide means upon being extended to said position just short of said fully extended position, said grab operator operable to rotate said grab actuator out of alignment with said guide means to an unlocked position such that said grab may be lowered over a fuel assembly and further operable to rotate said grab actuator and said grab back to said locked position, and means for engaging and preventing rotation of said fuel assembly relative to said guide means after said fuel assembly has been lifted.

2. Handling apparatus for nuclear fuel assemblies as claimed in claim 1 wherein said guide means comprise two oppositely disposed longitudinally extending channel members, the open sides of said channel members oriented inwardly of said apparatus and said grab actuator extending outwardly into said channels.

3. Handling apparatus for nuclear fuel assemblies as claimed in claim 2 and further including stop means for limiting the longitudinal movement of said grab and grab actuator and connecting means with respect to said guide means and said grab operator.

4. Handling apparatus for nuclear fuel assemblies comprising a horizontally movable and vertically stationary framework, a lifting assembly vertically movable within said framework, said lifting assembly comprising vertically extending guide means, grab means for engaging and disengaging fuel assemblies by the angular rotation thereof, a grab actuator, means connecting said grab to said grab actuator whereby angular rotation of said grab actuator causes angular rotation of said grab, said grab and grab actuator and connecting means vertically movable with respect to said guide means between a fully retracted and a fully extended position, said guide means engaging said grab actuator for guiding and preventing rotation of said grab actuator during said vertical movement from said fully retracted position to a position just short of said fully extended position, a grab operator, said grab operator including means for engaging said grab actuator, said engaging means normally aligned with said guide means whereby said grab actuator enters said grab operator upon reaching said position just short of said fully extended position, said grab operator operable to rotate said grab actuator to an unlocked position out of alignment with said guide means such that said grab may be lowered over a fuel assembly and further operable to rotate said grab actuator and said grab back to said locked position, means for engaging and preventing rotation of said fuel assembly relative to said guide means and said grab after said fuel assembly has been lifted, stop means for limiting the vertical movement of said grab and grab actuator and connecting means with respect to said guide means and said grab operator, and means for moving said grab and grab acuator and connecting means vertically with respect to said guide means between said fully retracted and said fully extended position and means for moving said lifting assembly vertically within said framework.

5. Handling apparatus for nuclear fuel assemblies as claimed in claim 4 wherein said means for moving said lifting assembly comprises said means for moving said grab and grab actuator and connecting means together with said stop means whereby said means for moving said grab and grab actuator and connecting means will lift and lower said lifting assembly when fully retracted against said stop means.

References Cited

UNITED STATES PATENTS

| 3,179,569 | 4/1965 | Fortescue et al. | 176—30 |
| 3,109,545 | 11/1963 | Hedin | 214—658 |

BENJAMIN R. PADGETT, *Primary Examiner.*

H. E. BEHREND, *Assistant Examiner.*

U.S. Cl. X.R.

176—30; 214—18; 294—86, 92